(12) United States Patent  (10) Patent No.: US 8,959,166 B1
Marra  (45) Date of Patent: Feb. 17, 2015

(54) SYSTEM AND METHOD FOR IDENTIFYING WEBSITES

(71) Applicant: Google Inc., Mountain View, CA (US)

(72) Inventor: Gregory Matthew Marra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 13/644,438

(22) Filed: Oct. 4, 2012

(51) Int. Cl.
    *G06F 15/16* (2006.01)
(52) U.S. Cl.
    USPC ........... 709/206; 709/203; 709/224; 715/230; 715/232; 715/758; 707/706; 705/14.53; 705/14.73
(58) Field of Classification Search
    CPC ........... G06F 17/241; G06F 17/30876; G06F 17/3089; G06Q 50/01; G06Q 30/0255; G06Q 30/0277; H04L 51/32; H04N 21/4756
    USPC .......... 709/203, 206, 224; 715/230, 232, 758; 705/14.53, 14.73
    See application file for complete search history.

(56) References Cited

U.S. PATENT DOCUMENTS

| 8,301,631 | B2 * | 10/2012 | Chow | 707/738 |
| 8,560,954 | B1 * | 10/2013 | Nakajima et al. | 715/753 |
| 8,667,385 | B1 * | 3/2014 | Mui et al. | 715/231 |
| 8,832,188 | B1 * | 9/2014 | Cierniak | 709/204 |
| 8,838,432 | B2 * | 9/2014 | Baker et al. | 704/1 |
| 2010/0251141 | A1 * | 9/2010 | Sabin et al. | 715/758 |
| 2010/0306242 | A1 * | 12/2010 | Chow | 707/769 |
| 2012/0131032 | A1 * | 5/2012 | Rakshit | 707/767 |
| 2012/0158516 | A1 * | 6/2012 | Wooten et al. | 705/14.66 |
| 2013/0007585 | A1 * | 1/2013 | Chow | 715/230 |
| 2013/0024762 | A1 * | 1/2013 | Chow | 715/230 |
| 2013/0097522 | A1 * | 4/2013 | Devries | 715/745 |
| 2013/0204608 | A1 * | 8/2013 | Baker et al. | 704/9 |
| 2013/0204705 | A1 * | 8/2013 | Song | 705/14.58 |
| 2013/0346183 | A1 * | 12/2013 | Chandra et al. | 705/14.41 |
| 2014/0019882 | A1 * | 1/2014 | Chew et al. | 715/753 |
| 2014/0236720 | A1 * | 8/2014 | Shunock et al. | 705/14.54 |

OTHER PUBLICATIONS

"Diigo Unveils Innovative "social Annotation" Service for the Web; Setting a New standard for Online Research and Collaboration Tools", Aug. 2006, PR Newswire Association LLC.*

Xing Hong Jiang, "The Study and Pratice of Social Annotation," East china Normal University, ProQuest, UMI Dissertations Publlishing, 2008.*

* cited by examiner

*Primary Examiner* — Oanh Duong (74) *Attorney, Agent, or Firm* — Patent Law Works LLP (57) ABSTRACT

A method in accordance with the present disclosure may include identifying a first set of visits to one or more webpages by a first participant of a social network, determining whether the first participant received a social annotation during the visit to the webpages, calculating a first total number of missed social annotations for each of the webpages for the first participant of the social network based on the first set of visits to the webpages and the determined social annotations received during the visit to the webpages, determining a combined calculation of missed social annotations for each of the webpages based at least in part on the total number of missed social annotations for each of the webpages for the first participant and the total number of missed social annotations for each of the webpages for the second participant, generating an indication for a third participant.

30 Claims, 4 Drawing Sheets

Google
www.google.com/
Search the world's information, including webpages, images, videos and more. Google has many special features to help you find exactly what you're looking ...
+ Show stock quote for GOOG Larry Page shared this on Google+ — Show

302

Google+: real life sharing, rethought for the web. - Google
https://plus.google.com/
Google+ aims to make sharing on the web more like sharing in real life. Check out Circles, Messenger and Hangouts, just a few of the things we've been ...

You, Y. Joy Ding, Kate Cushing and 55 other people +1d this

SYSTEM AND METHOD FOR IDENTIFYING WEBSITES

TECHNICAL FIELD

This disclosure relates to a method for identifying websites and, more particularly, to a method of identifying websites which a user can most influentially endorse.

BACKGROUND

Search engines, social websites, and advertising networks have features that allow for social endorsements on webpages. These features show "Your friend endorsed this webpage" on search results, on a publisher widget, or on advertisements. However, often there is no social annotation to show a user. A social annotation may refer to an annotation added to a web search result that may provide a social context. For example, an annotation associated with a particular web page may indicate that the web page was shared, created and/or liked by one of the searcher's online contacts. Social annotations associated with advertisements may result in an increase in click-through-rate, which corresponds to the number of clicks on an advertisement divided by the number of times the advertisement is shown.

SUMMARY OF DISCLOSURE

In one implementation, a method, in accordance with this disclosure, may include identifying, using one or more computing devices, a first set of visits to one or more webpages by a first participant of a social network. The method may further include determining, using the one or more computing devices, for each of the first set of visits to the one or more webpages, whether the first participant received a social annotation during the visit to the one or more webpages. The method may also include identifying, using one or more computing devices, a second set of visits to at least one of the one or more webpages by a second participant of the social network. The method may additionally include determining, using the one or more computing devices, whether the second participant received a social annotation during at least one of the second set of visits to the one or more webpages. The method may also include calculating, using the one or more computing devices, a first total number of missed social annotations for each of the one or more webpages for the first participant of the social network based at least in part on the first set of visits to the one or more webpages and the determined social annotations received during the visit to the one or more webpages. The method may further include calculating, using the one or more computing devices, a second total number of missed social annotations for each of the one or more webpages for the second participant of the social network. The method may also include determining, using the one or more computing devices, a combined calculation of missed social annotations for each of the one or more webpages based at least in part on the total number of missed social annotations for each of the one or more webpages for the first participant and the total number of missed social annotations for each of the one or more webpages for the second participant. The method may additionally include generating, using the one or more computing devices, an indication for a third participant of one or more websites for which to provide a social annotation based at least in part on the combined calculation of missed social annotations for each of the one or more webpages. The method may further include providing for display to the third participant, using the one or more computing devices, the indication of one or more websites for which to provide social annotation.

One or more of the following features may be included. In some embodiments, the method may include determining, using the one or more computing devices, a value coefficient for at least one of the one or more webpages. The method may also include associating, using the one or more computing devices, the value coefficient to at least one of the one or more webpages. The method may also include providing, using the one or more computing devices, at least one of the first participant, the second participant, and the third participant with an option to annotate a webpage based upon, at least in part, the value coefficient. The method may further include determining, using the one or more computing devices, a value of a social annotation received in connection with an advertisement associated with at least one of the one or more webpages. In some embodiments, the value coefficient may be based upon, at least in part, a number of advertisements served on a website. In some embodiments, the value coefficient may be based upon, at least in part, a probability that a webpage appears in a search result. In some embodiments, at least two of the first, second and third participants may be connected via a social network. In some embodiment, the method may include providing for display at least one of a first total number of missed social annotations and a second total number of missed social annotations. In some embodiments, the combined calculation of missed social annotations may be based upon, at least in part, the value coefficient.

In another implementation, a computer program product residing on a computer readable storage medium having a plurality of instructions stored thereon is provided. In some embodiments, the instructions, which when executed by a processor, cause the processor to perform one or more operations. Some operations may include identifying, using one or more computing devices, a first set of visits to one or more webpages by a first participant of a social network. Operations may further include determining, using the one or more computing devices, for each of the first set of visits to the one or more webpages, whether the first participant received a social annotation during the visit to the one or more webpages. Operations may also include identifying, using one or more computing devices, a second set of visits to at least one of the one or more webpages by a second participant of the social network. Operations may additionally include determining, using the one or more computing devices, whether the second participant received a social annotation during at least one of the second set of visits to the one or more webpages. Operations may also include calculating, using the one or more computing devices, a first total number of missed social annotations for each of the one or more webpages for the first participant of the social network based at least in part on the first set of visits to the one or more webpages and the determined social annotations received during the visit to the one or more webpages. Operations may further include calculating, using the one or more computing devices, a second total number of missed social annotations for each of the one or more webpages for the second participant of the social network. Operations may also include determining, using the one or more computing devices, a combined calculation of missed social annotations for each of the one or more webpages based at least in part on the total number of missed social annotations for each of the one or more webpages for the first participant and the total number of missed social annotations for each of the one or more webpages for the second participant. Operations may additionally include generating, using the one or more computing devices, an indication for a third participant of one or more websites for which to provide a social annotation based at least in part on the combined calculation of missed social annotations for each of the one or more webpages. Operations may further include providing for display to the third participant, using the one or more computing devices, the indication of one or more websites for which to provide social annotation.

One or more of the following features may be included. In some embodiments, operations may include determining, using the one or more computing devices, a value coefficient for at least one of the one or more webpages. Operations may also include associating, using the one or more computing devices, the value coefficient to at least one of the one or more webpages. Operations may also include providing, using the one or more computing devices, at least one of the first participant, the second participant, and the third participant with an option to annotate a webpage based upon, at least in part, the value coefficient. Operations may further include determining, using the one or more computing devices, a value of a social annotation received in connection with an advertisement associated with at least one of the one or more webpages. In some embodiments, the value coefficient may be based upon, at least in part, a number of advertisements served on a website. In some embodiments, the value coefficient may be based upon, at least in part, a probability that a webpage appears in a search result. In some embodiments, at least two of the first, second and third participants may be connected via a social network. In some embodiment, operations may include providing for display at least one of a first total number of missed social annotations and a second total number of missed social annotations. In some embodiments, the combined calculation of missed social annotations may be based upon, at least in part, the value coefficient.

In another implementation, a computing system is provided. In some embodiments, the computing system may include one or more processors configured to identify a first set of visits to one or more webpages by a first participant of a social network, the one or more processors further configured to determine for each of the first set of visits to the one or more webpages, whether the first participant received a social annotation during the visit to the one or more webpages, the one or more processors further configured to identify a second set of visits to at least one of the one or more webpages by a second participant of the social network, the one or more processors further configured to determine whether the second participant received a social annotation during at least one of the second set of visits to the one or more webpages, the one or more processors further configured to calculate a first total number of missed social annotations for each of the one or more webpages for the first participant of the social network based at least in part on the first set of visits to the one or more webpages and the determined social annotations received during the visit to the one or more webpages, the one or more processors further configured to calculate a second total number of missed social annotations for each of the one or more webpages for the second participant of the social network, the one or more processors further configured to determine a combined calculation of missed social annotations for each of the one or more webpages based at least in part on the total number of missed social annotations for each of the one or more webpages for the first participant and the total number of missed social annotations for each of the one or more webpages for the second participant, the one or more processors further configured to generate an indication for a third participant of one or more websites for which to provide a social annotation based at least in part on the combined calculation of missed social annotations for each of the one or more webpages, the one or more processors further configured to provide for display to the third participant the indication of one or more websites for which to provide social annotation.

One or more of the following features may be included. In some embodiments, the one or more processors may be further configured to determine a value coefficient for at least one of the one or more webpages. The one or more processors may be further configured to associate the value coefficient to at least one of the one or more webpages. The one or more processors may be further configured to provide at least one of the first participant, the second participant, and the third participant with an option to annotate a webpage based upon, at least in part, the value coefficient. The one or more processors may be further configured to determine a value of a social annotation received in connection with an advertisement associated with at least one of the one or more webpages. In some embodiments, the value coefficient may be based upon, at least in part, a number of advertisements served on a website. In some embodiments, the value coefficient may be based upon, at least in part, a probability that a webpage appears in a search result. In some embodiments, at least two of the first, second and third participants may be connected via a social network. In some embodiments, the one or more processors may be further configured to provide for display at least one of a first total number of missed social annotations and a second total number of missed social annotations. In some embodiments, the combined calculation of missed social annotations may be based upon, at least in part, the value coefficient.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Overview

Search engines, social websites, and advertising networks have features that allow for social endorsements or annotations on webpages. These types of features show "Your friend endorsed this webpage" on search results, on a publisher widget, or on advertisements.

However, often there is no social annotation to show a user. For example, there may be a social endorsement (e.g. a "+1" button) associated with a particular website advertisement, but if none of that user's social contacts have endorsed that website, there is no content to display as a social annotation.

Social annotations may have the ability to generate a click through rate uplift and provide value to users and businesses alike. In other words, having had a social annotation to display on a particular website would provide more valuable to both the user and to the company hosting the website.

Embodiments of the present disclosure describe a technique that may be used to identify the most valuable websites for any given user to endorse, given the users in their social network's browsing behaviors. Accordingly, embodiments described herein may provide the ability to log when users could have seen a social annotation, but did not, because there was not one to show. For each user, embodiments disclosed herein may also provide techniques for building a model that may combine each of these missed social annotations.

For example, the number of visits that each user made to a particular webpage without receiving a personalized annotation may be collected as shown below.
"user": "User 1",
"user_id": "12381589235",
"missed_annotation_impressions": [
    "http://www.google.com": 15,
    "http://www.hipmunk.com": 7,
    "http://www.nike.com/shoes": 2, . . . ],
"user": "User 2",
"user_id": "123811539231",
"missed_annotation_impressions": [
    "http://www.google.com": 12,
    "http://www.hipmunk.com": 7,
    "http://en.wikipedia.org/wiki/long_random_tail_page": 1, . . . ], With this information collected, embodiments described herein, may allow, for each user, to obtain the "missed annotation impressions" from each of their incoming edges, and sum them. In this way, with reference to FIG. 1, if user 1 is followed by Alice, Bob, and Charlie, identification process 10 may be configured to sum Alice, Bob, and Charlie's "missed annotation impressions" into a single weighted set as is shown below.
"merged_missed_annotation_impressions": [
    "http://www.google.com": 27,
    "http://www.hipmunk.com": 14,
    "http://www.nike.com/shoes": 2,
"http://en.wikipedia.org/wiki/long_random_tail_page": 1, . . . ], In some embodiments, a dictionary of uniform resource locators (URLs) may be created, that if the user had socially annotated (e.g. +1'd), their followers would have had an improved searching experience, with the number of improved impressions. Embodiments described herein may also include, for each URL, determining a value coefficient. For example, 500 latent annotations of http://en.wikipedia.org/wiki/Shoe might be less economically valuable than 100 latent annotations of http://www.nike.com/. The URLs having the highest value coefficient may now identify the URLs for which it would be beneficial for the user to provide a social annotation. Accordingly, embodiments described herein may allow for the calculation of what URLs are the most valuable to get individual users to socially annotate. Once the most valuable URLs have been determined, embodiments described herein may be used to encourage particular users to socially annotate (e.g. +1, "Like", etc.) those URLs. The value coefficient may be determined using any suitable approach, including, but not limited to, the total number of advertisements served on a website, a probability that a webpage appears in a search result, etc.

An Example System Overview:

Referring to FIGS. 1-4, there is shown an identification process 10 that may reside on and may be executed by computer 12, which may be connected to network 14 (e.g., the Internet or a local area network). Server application 20 may include some or all of the elements of identification process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, or a computing cloud. The various components of computer 12 may execute one or more operating systems, examples of which may include but are not limited to: Microsoft Windows Server™; Novell Netware™; Redhat Linux™, Unix, or a custom operating system, for example.

Figure 2:
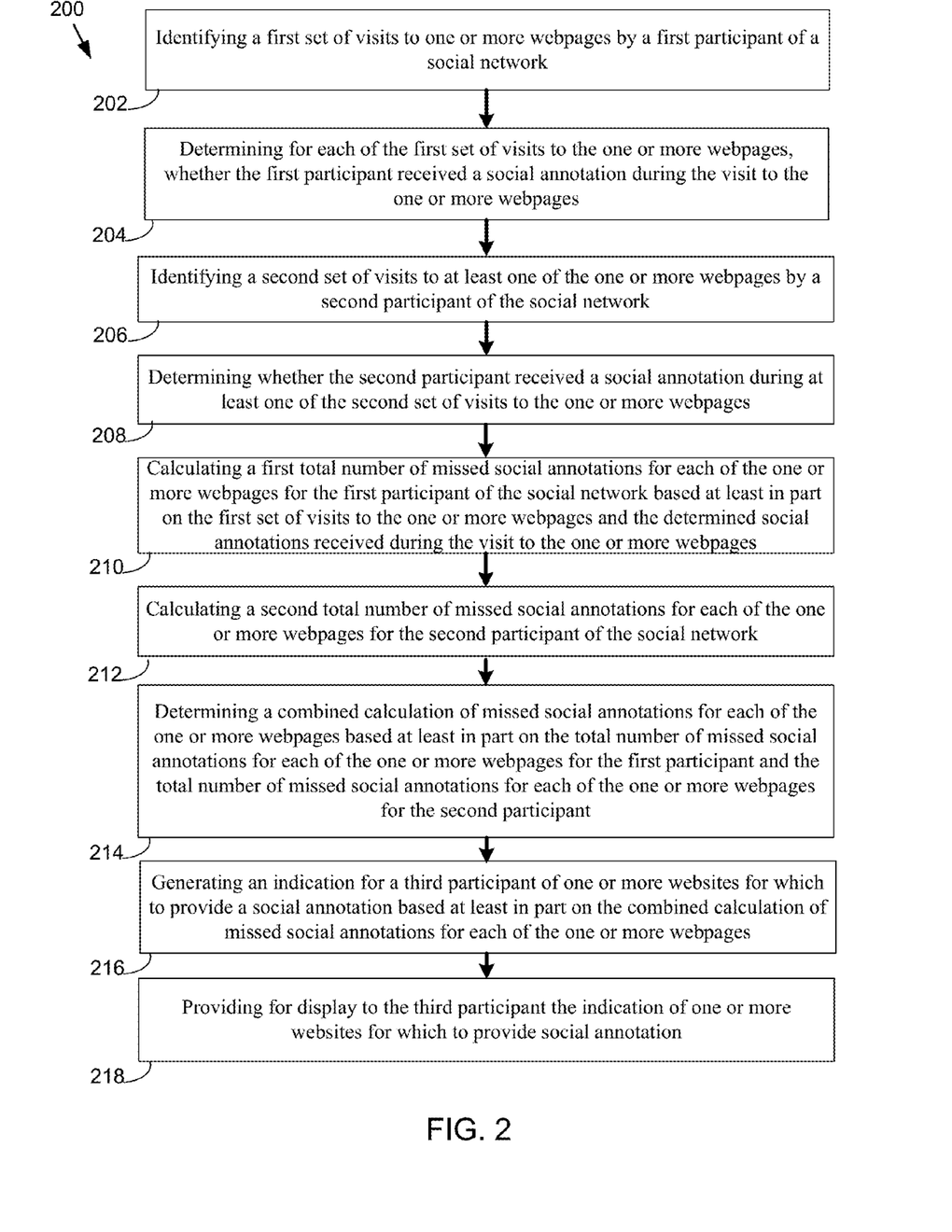
FIG. 2 is a flowchart of the method for identifying websites of FIG. 1 in accordance with an embodiment of the present disclosure.

With reference to FIG. 2, and as will be discussed below in greater detail, identification process 10 may include identifying (202), using one or more computing devices, a first set of visits to one or more webpages by a first participant of a social network. The method may further include determining (204), using the one or more computing devices, for each of the first set of visits to the one or more webpages, whether the first participant received a social annotation during the visit to the one or more webpages. The method may also include identifying (206), using one or more computing devices, a second set of visits to at least one of the one or more webpages by a second participant of the social network. The method may additionally include determining (208), using the one or more computing devices, whether the second participant received a social annotation during at least one of the second set of visits to the one or more webpages. The method may also include calculating (210), using the one or more computing devices, a first total number of missed social annotations for each of the one or more webpages for the first participant of the social network based at least in part on the first set of visits to the one or more webpages and the determined social annotations received during the visit to the one or more webpages. The method may further include calculating (212), using the one or more computing devices, a second total number of missed social annotations for each of the one or more webpages for the second participant of the social network. The method may also include determining (214), using the one or more computing devices, a combined calculation of missed social annotations for each of the one or more webpages based at least in part on the total number of missed social annotations for each of the one or more webpages for the first participant and the total number of missed social annotations for each of the one or more webpages for the second participant. The method may additionally include generating (216), using the one or more computing devices, an indication for a third participant of one or more websites for which to provide a social annotation based at least in part on the combined calculation of missed social annotations for each of the one or more webpages. The method may further include providing (218) for display to the third participant, using the one or more computing devices, the indication of one or more websites for which to provide social annotation.

Referring back to FIG. 1, the instruction sets and subroutines of identification process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Figure 1:
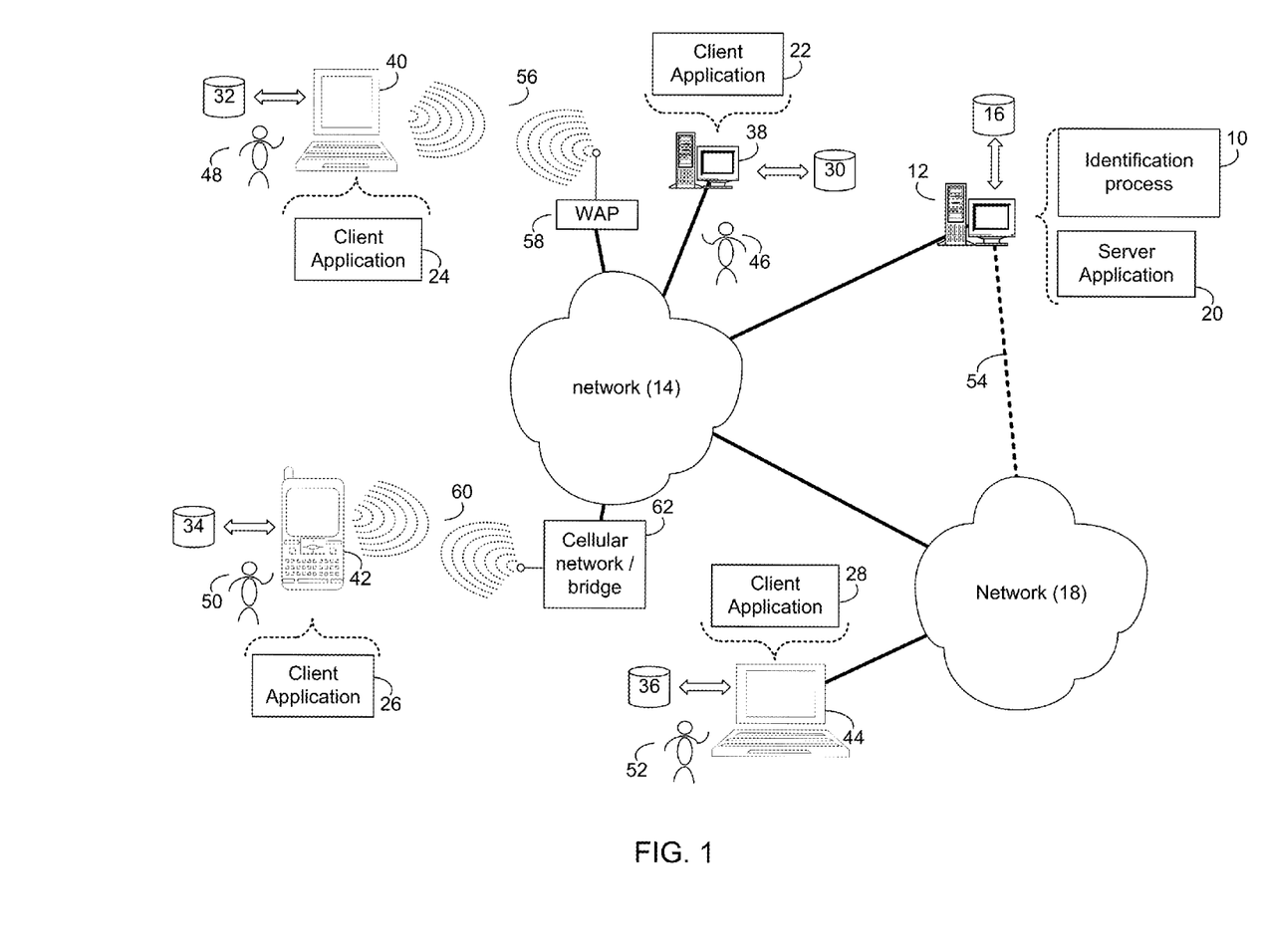
FIG. 1 is a diagrammatic view of a method for identifying websites in accordance with an embodiment of the present disclosure.

Network 14 may be connected to one or more secondary networks (e.g., network 18), examples of which may include but are not limited to: a local area network; a wide area network; or an intranet, for example.

Identification process 10 may be accessed via client applications 22, 24, 26, 28. Examples of client applications 22, 24, 26, 28 may include but are not limited to a standard web browser, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet computer (not shown), a server (not shown), a data-enabled, cellular telephone (not shown), a television with one or more processors embedded therein or coupled thereto, and a dedicated network device (not shown).

One or more of client applications 22, 24, 26, 28 may be configured to effectuate some or all of the functionality of identification process 10. Accordingly, identification process 10 may be a purely server-side application, a purely client-side application, or a hybrid server-side/client-side application that is cooperatively executed by one or more of client applications 22, 24, 26, 28 and identification process 10.

Users 46, 48, 50, 52 may access computer 12 and identification process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

A number of users 46, 48, 50, and 52 of the client devices 38, 40, 42, 44, respectively, may access the server device 12 to participate in a social networking service. For example, the client devices 38, 40, 42, 44 may execute web browser applications that can be used to access the social networking service. In another example, the client devices 38, 40, 42, 44 may execute software applications that are specific to the social network (e.g., social networking "apps" running on smartphones).

The users 46, 48, 50, and 52 may participate in the social networking service provided by server device 12 by posting information, such as text comments (e.g., updates, announcements, replies), digital photos, videos, or other appropriate electronic information. In some implementations, information can be posted on a user's behalf by systems and/or services external to the social network or the server device 12. For example, the user 46 may post a review of a movie to a movie review website, and with proper permissions that website may cross-post the review to the social network on the user's 46 behalf. In another example, a software application executing on a mobile device, with proper permissions, may use global positioning system (GPS) capabilities to determine the user's location and automatically update the social network with his location (e.g., "At Home", "At Work", etc.).

Figure 3:
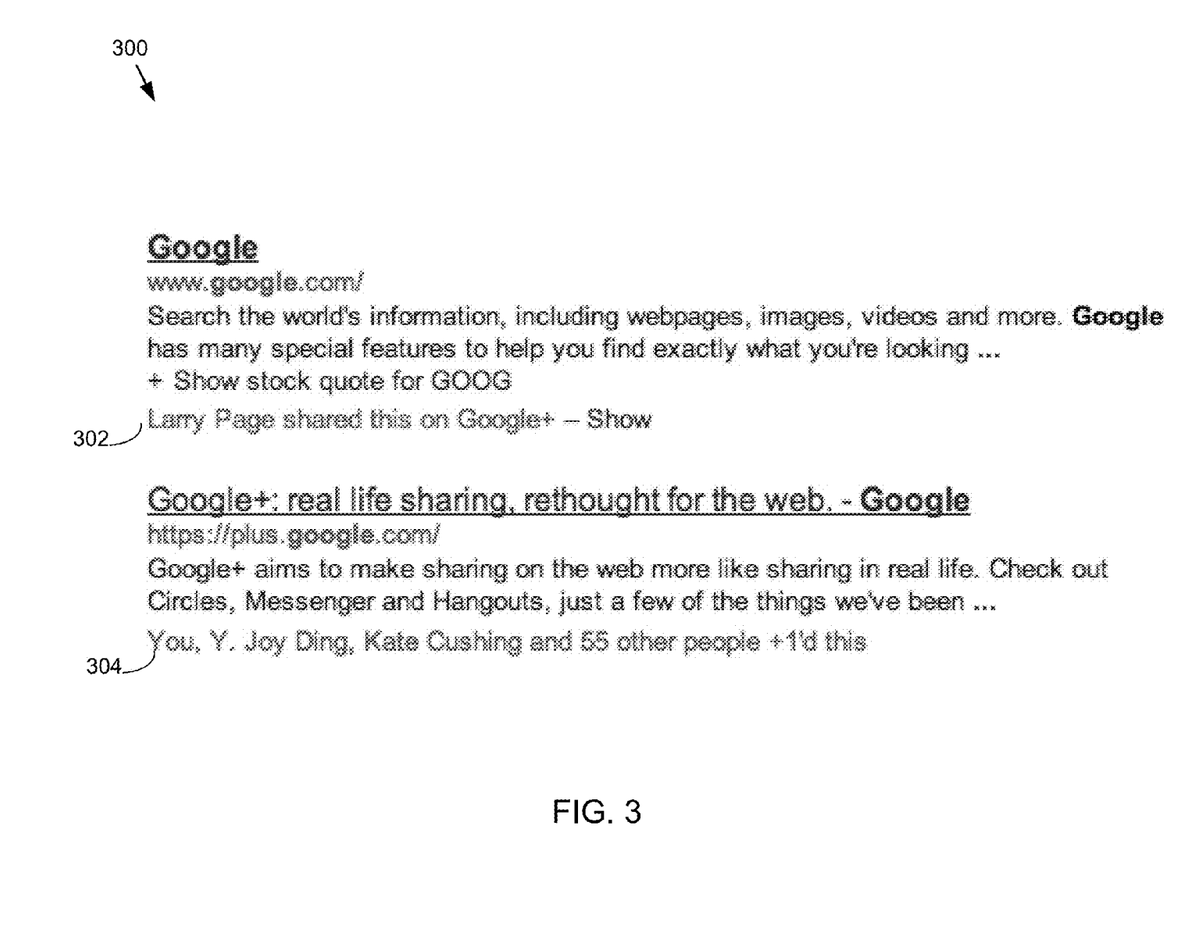
FIG. 3 is a diagrammatic view of an interface rendered by the method for identifying websites of FIG. 1 in accordance with an embodiment of the present disclosure.

FIG. 3 depicts an example set of search results, each having a corresponding social annotation. For example, social annotation 302 depicts an example of a website that was shared with one or more contacts associated with a social network. Social annotation 304 depicts an example of a website that was recommended by one or more contacts of a social network.

Embodiments of the present disclosure describe a technique that may be used to identify the most valuable websites for any given user to endorse, given the users in their social network's browsing behaviors. Accordingly, embodiments described herein may provide the ability to log when users could have seen a social annotation, but did not, because there was not one to show (in contrast to the embodiment shown in FIG. 3). For each user, embodiments disclosed herein may also provide techniques for building a model that may combine each of these missed social annotations. As discussed above, embodiments of the identification process 10 described herein may also allow for the creation of a dictionary of URLs which, if the user had socially annotated (e.g., +1'd, etc), their social network contacts or followers would have had an improved search experience.

Referring again to FIGS. 1-2, in some embodiments, identification process 10 may include identifying (202) a first set of visits to one or more webpages by a first participant of a social network. In this way, a first user (e.g. user 46) may access a website using client application 22 associated with computing device 38. Identification process 10 may then determine (204) for each of the first set of visits to the one or more webpages, whether the first user (e.g. user 46) received a social annotation during the visit to the one or more webpages.

Additionally and/or alternatively, identification process 10 may further include identifying (206) a second set of visits to at least one of the one or more webpages by a second participant of the social network. Accordingly, a second user (e.g. user 48) may access the same website as user 46 above using client application 24 associated with computing device 40. Identification process 10 may then determine (208) whether the second user (e.g. user 48) received a social annotation during at least one of the second set of visits to the one or more webpages.

Identification process 10 may further include calculating (210) a first total number of missed social annotations for each of the one or more webpages for the first participant of the social network, in this particular example, user 46. In some embodiments, this calculation may be based on the first set of visits to the one or more webpages by user 46 and the determined social annotations received during the visit to the one or more webpages.

Identification process 10 may further include calculating (212) a second total number of missed social annotations for each of the one or more webpages for the second participant of the social network, in this particular example, user 48. In some embodiments, calculating may be based at least in part on the second set of visits to the one or more webpages and the determined social annotations received during the visit to the one or more webpages Identification process 10 may further include determining (214) a combined calculation of missed social annotations for each of the one or more webpages. As discussed above, this calculation may be based on the total number of missed social annotations for each of the one or more webpages for the first participant and the total number of missed social annotations for each of the one or more webpages for the second participant (in this particular example users 46 and 48). In some embodiments, the combined calculation of missed social annotations may be based upon a value coefficient as is discussed in further detail below.

Identification process 10 may further include generating (216) an indication for a third participant (e.g. user 50) of one or more websites for which to provide a social annotation based at least in part on the combined calculation of missed social annotations for each of the one or more webpages. Accordingly, identification process 10 may further include providing (218) for display to the third participant the indication of one or more websites for which to provide social annotation. In this way, user 50 may view the indication using client application 26 associated with computing device 42.

Figure 4:
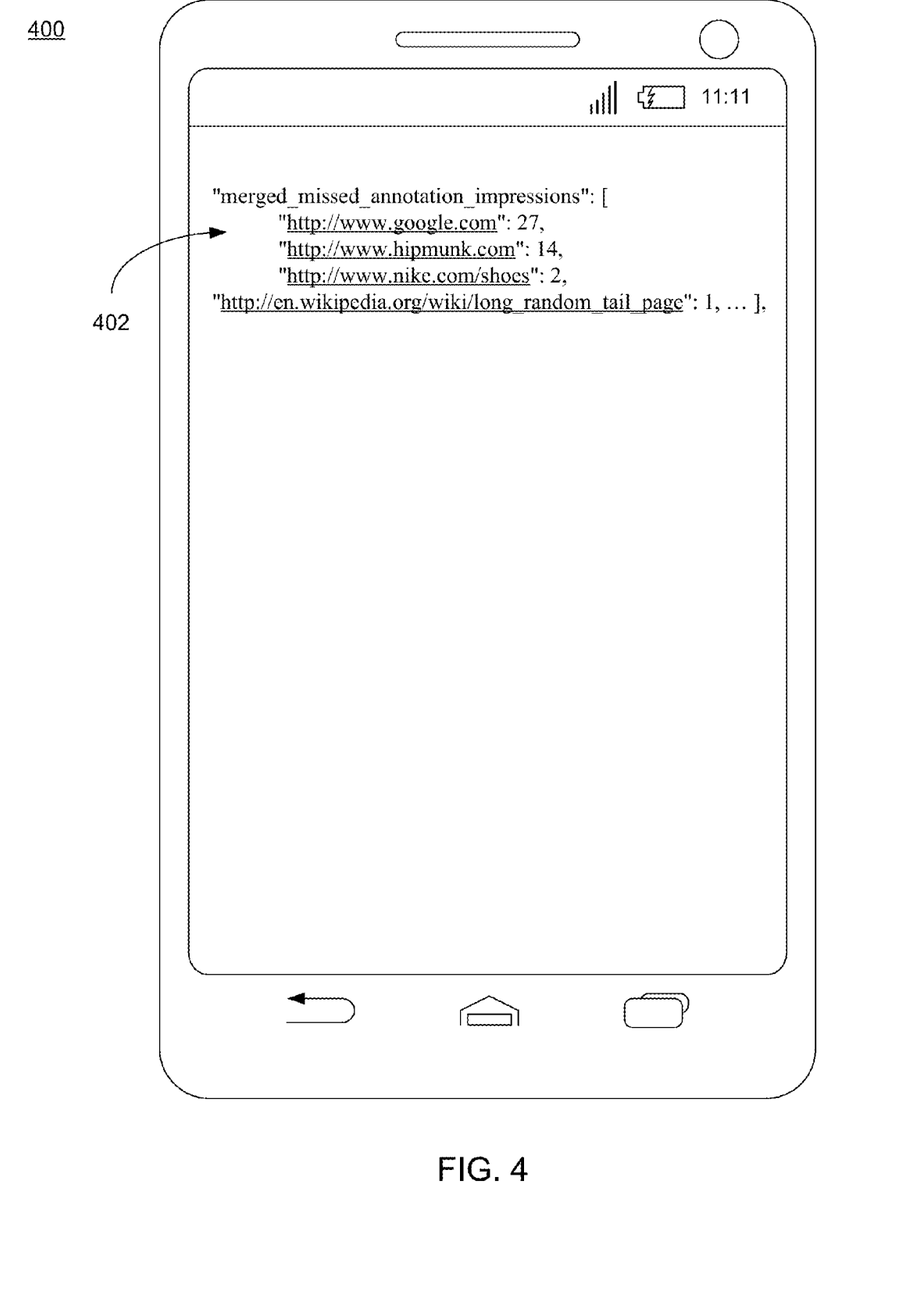
FIG. 4 is a diagrammatic view of an interface associated with a computing device in accordance with an embodiment of the present disclosure.

Referring now to FIG. 4, identification process 10 may be configured to provide for display one or more of the missed social annotations 402. The missed social annotations may include at least one of a first total number of missed social annotations and a second total number of missed social annotations as is shown in FIG. 4.

In this way, and in accordance with identification process 10, the number of visits that each user made to a particular webpage without receiving a personalized annotation may be collected as shown below.
"user": "User 1",
"user_id": "12381589235",
"missed_annotation_impressions": [
    "http://www.google.com": 15,
    "http://www.hipmunk.com": 7,
    "http://www.nike.com/shoes": 2, . . . ],
"user": "User 2",
"user_id": "123811539231",
"missed_annotation_impressions": [
    "http://www.google.com": 12,
    "http://www.hipmunk.com": 7,
    "http://en.wikipedia.org/wiki/long_random_tail_page": 1, . . . ], With this information collected, identification process 10, may allow, for each user, to obtain the "missed annotation impressions" from each of their incoming edges, and sum them. In this way, if User 1 above is followed by Alice, Bob, and Charlie, identification process 10 may be configured to sum Alice, Bob, and Charlie's "missed annotation impressions" into a single weighted set as is shown below.

"merged_missed_annotation_impressions": [
    "http://www.google.com": 27,
    "http://www.hipmunk.com": 14,
    "http://www.nike.com/shoes": 2,
"http://en.wikipedia.org/wiki/long_random_tail_page": 1, . . . ], As discussed above, in some embodiments, identification process 10 may be configured to generate a dictionary of uniform resource locators (URLs). This dictionary of URLs may provide a list, that if the user had socially annotated (e.g. +1'd), their followers would have had an improved searching experience.

Identification process 10 may further include determining a value coefficient for at least one of the one or more webpages. The value coefficient may be determined using any suitable approach, including, but not limited to, the total number of advertisements served on a website, a probability that a webpage appears in a search result, or using any other suitable approach. Accordingly, identification process 10 may be configured to determine a value of a social annotation received in connection with an advertisement associated with at least one of the one or more webpages.

Additionally and/or alternatively, the value coefficient may be generated based on an expected click-through-rate uplift for social annotations*number of advertisements served for that URL per day*cost per impression ("CPM") of the advertisement. The value coefficient may also take into account the global odds that that URL shows up in a search. Identification process 10 may also be configured to promote URLs for "known good quality" websites based on search click signals or to promote URLs that are seen by a broader number of users. Identification process 10 may also be configured to demote URLs for "known bad quality" websites such as content farms, search signals, spyware, etc.

For example, 500 latent annotations of http://en.wikipedia.org/wiki/Shoe might be less economically valuable than 100 latent annotations of http://www.nike.com/. The URLs having the highest value coefficient may now identify the URLs for which it would be beneficial for the user to provide a social annotation. Accordingly, identification process 10 may allow for the calculation of what URLs are the most valuable to get individual users to socially annotate. Once the most valuable URLs have been determined, embodiments described herein may be used to encourage particular users to socially annotate (e.g. +1, "Like", etc.) those URLs.

Identification process 10 may also be configured to associate the value coefficient with at least one of the one or more webpages. Additionally and/or alternatively, identification process 10 may be configured to provide at least one of the first participant, the second participant, and the third participant (e.g. users 46, 48, and/or 50) with an option to annotate a webpage based upon the value coefficient.

Example Additional Embodiments

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    identifying, using one or more computing devices, a first set of visits to one or more webpages by a first participant of a social network;
    determining, using the one or more computing devices, for each of the first set of visits to the one or more webpages, whether the first participant received a social annotation during each of the first set of the visits to the one or more webpages;

identifying, using one or more computing devices, a second set of visits to at least one of the one or more webpages by a second participant of the social network;

determining, using the one or more computing devices, whether the second participant received a social annotation during at least one of the second set of visits to the one or more webpages;

calculating, using the one or more computing devices, a first total number of missed social annotations for each of the one or more webpages for the first participant of the social network based at least in part on the first set of visits to the one or more webpages and the determined social annotations received during said each of the first set of the visits to the one or more webpages;

calculating, using the one or more computing devices, a second total number of missed social annotations for said each of the one or more webpages for the second participant of the social network;

determining, using the one or more computing devices, a combined calculation of missed social annotations for said each of the one or more webpages based at least in part on the first total number of missed social annotations for each of the one or more webpages for the first participant and the second total number of missed social annotations for said each of the one or more webpages for the second participant;

generating, using the one or more computing devices, an indication for a third participant of one or more websites for which to provide a social annotation based at least in part on the combined calculation of missed social annotations for said each of the one or more webpages; and providing for display to the third participant, using the one or more computing devices, the indication of one or more websites for which to provide the social annotation.

2. The computer-implemented method of claim 1, further comprising:

determining, using the one or more computing devices, a value coefficient for at least one of the one or more webpages.

3. The computer-implemented method of claim 2, further comprising:

associating, using the one or more computing devices, the value coefficient to at least one of the one or more webpages.

4. The computer-implemented method of claim 3, further comprising:

providing, using the one or more computing devices, at least one of the first participant, the second participant, and the third participant with an option to annotate a webpage based upon, at least in part, the value coefficient.

5. The computer-implemented method of claim 2, wherein the value coefficient is based upon, at least in part, a number of advertisements served on a website.

6. The computer-implemented method of claim 2, wherein the value coefficient is based upon, at least in part, a probability that a webpage appears in a search result.

7. The computer-implemented method of claim 2, wherein the combined calculation of missed social annotations is based upon, at least in part, the value coefficient.

8. The computer-implemented method of claim 1, further comprising:

determining, using the one or more computing devices, a value of a social annotation received in connection with an advertisement associated with at least one of the one or more webpages.

9. The computer-implemented method of claim 1, wherein at least two of the first, second and third participants are connected via a social network.

10. The computer-implemented method of claim 1, further comprising:

providing for display at least one of a first total number of missed social annotations and a second total number of missed social annotations.

11. A non-transitory processor readable storage medium having a plurality of instructions stored thereon that when executed by a processor, cause the processor to perform operations comprising:

identifying, using one or more computing devices, a first set of visits to one or more webpages by a first participant of a social network;

determining, using the one or more computing devices, for each of the first set of visits to the one or more webpages, whether the first participant received a social annotation during said each of the first set of the visits to the one or more webpages;

identifying, using one or more computing devices, a second set of visits to at least one of the one or more webpages by a second participant of the social network;

determining, using the one or more computing devices, whether the second participant received a social annotation during at least one of the second set of visits to the one or more webpages;

calculating, using the one or more computing devices, a first total number of missed social annotations for each of the one or more webpages for the first participant of the social network based at least in part on the first set of visits to the one or more webpages and the determined social annotations received during said each of the first set of the visits to the one or more webpages;

calculating, using the one or more computing devices, a second total number of missed social annotations for said each of the one or more webpages for the second participant of the social network;

determining, using the one or more computing devices, a combined calculation of missed social annotations for said each of the one or more webpages based at least in part on the first total number of missed social annotations for said each of the one or more webpages for the first participant and the second total number of missed social annotations for said each of the one or more webpages for the second participant;

generating, using the one or more computing devices, an indication for a third participant of one or more websites for which to provide a social annotation based at least in part on the combined calculation of missed social annotations for said each of the one or more webpages; and providing for display to the third participant, using the one or more computing devices, the indication of one or more websites for which to provide the social annotation.

12. The non-transitory processor readable storage medium of claim 11, further comprising:

determining, using the one or more computing devices, a value coefficient for at least one of the one or more webpages.

13. The non-transitory processor readable storage medium of claim 12, further comprising:

associating, using the one or more computing devices, the value coefficient to at least one of the one or more webpages.

14. The non-transitory processor readable storage medium of claim 13, further comprising:
providing, using the one or more computing devices, at least one of the first participant, the second participant, and the third participant with an option to annotate a webpage based upon, at least in part, the value coefficient.

15. The non-transitory processor readable storage medium of claim 12, wherein the value coefficient is based upon, at least in part, a number of advertisements served on a website.

16. The non-transitory processor readable storage medium of claim 12, wherein the value coefficient is based upon, at least in part, a probability that a webpage appears in a search result.

17. The non-transitory processor readable storage medium of claim 12, wherein the combined calculation of missed social annotations is based upon, at least in part, the value coefficient.

18. The non-transitory processor readable storage medium of claim 11, further comprising:
determining, using the one or more computing devices, a value of a social annotation received in connection with an advertisement associated with at least one of the one or more webpages.

19. The non-transitory processor readable storage medium of claim 11, wherein at least two of the first, second and third participants are connected via a social network.

20. The non-transitory processor readable storage medium of claim 11, further comprising:
providing for display at least one of a first total number of missed social annotations and a second total number of missed social annotations.

21. A computing system, comprising:
one or more processors configured to identify a first set of visits to one or more webpages by a first participant of a social network, the one or more processors further configured to determine for each of the first set of visits to the one or more webpages, whether the first participant received a social annotation during said each of the first set of the visits to the one or more webpages, the one or more processors further configured to identify a second set of visits to at least one of the one or more webpages by a second participant of the social network, the one or more processors further configured to determine whether the second participant received a social annotation during at least one of the second set of visits to the one or more webpages, the one or more processors further configured to calculate a first total number of missed social annotations for said each of the one or more webpages for the first participant of the social network based at least in part on the first set of visits to the one or more webpages and the determined social annotations received during said each of the first set of the visits to the one or more webpages, the one or more processors further configured to calculate a second total number of missed social annotations for said each of the one or more webpages for the second participant of the social network, the one or more processors further configured to determine a combined calculation of missed social annotations for said each of the one or more webpages based at least in part on the first total number of missed social annotations for said each of the one or more webpages for the first participant and the second total number of missed social annotations for said each of the one or more webpages for the second participant, the one or more processors further configured to generate an indication for a third participant of one or more websites for which to provide a social annotation based at least in part on the combined calculation of missed social annotations for said each of the one or more webpages, the one or more processors further configured to provide for display to the third participant the indication of one or more websites for which to provide the social annotation.

22. The computing system of claim 21, wherein the one or more processors are further configured to determine a value coefficient for at least one of the one or more webpages.

23. The computing system of claim 22, wherein the one or more processors are further configured to associate the value coefficient to at least one of the one or more webpages.

24. The computing system of claim 23, wherein the one or more processors are further configured to provide at least one of the first participant, the second participant, and the third participant with an option to annotate a webpage based upon, at least in part, the value coefficient.

25. The computing system of claim 22, wherein the value coefficient is based upon, at least in part, a number of advertisements served on a website.

26. The computing system of claim 22, wherein the value coefficient is based upon, at least in part, a probability that a webpage appears in a search result.

27. The computing system of claim 22, wherein the combined calculation of missed social annotations is based upon, at least in part, the value coefficient.

28. The computing system of claim 21, wherein the one or more processors are further configured to determine a value of a social annotation received in connection with an advertisement associated with at least one of the one or more webpages.

29. The computing system of claim 21, wherein at least two of the first, second and third participants are connected via a social network.

30. The computing system of claim 21, wherein the one or more processors are further configured to provide for display at least one of a first total number of missed social annotations and a second total number of missed social annotations.

* * * * *